Aug. 30, 1949.   O. O. TORREY   2,480,310
ADJUSTABLE SEAT BRACKET
Filed Aug. 10, 1945
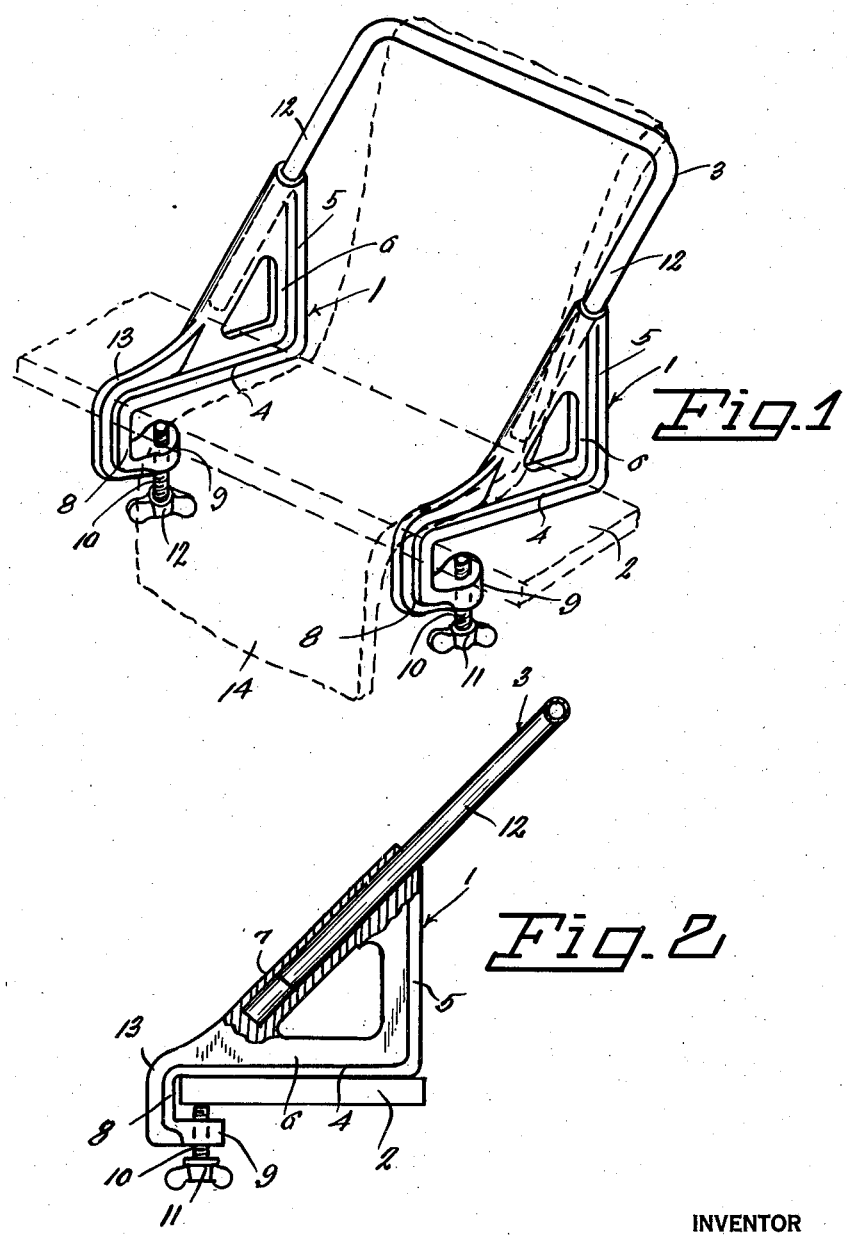
INVENTOR
Orrin O. Torrey
BY
Glenn L. Fish
ATTORNEY Patented Aug. 30, 1949

2,480,310

UNITED STATES PATENT OFFICE 2,480,310

ADJUSTABLE SEAT BRACKET

Orrin O. Torrey, Spokane, Wash.

Application August 10, 1945, Serial No. 610,019

1 Claim. (Cl. 155—133)

This invention relates to a portable back rest for a seat and it is one object of the invention to provide a device of this character consisting of brackets adapted to be clamped to a seat of a boat, grandstand, or the like and carrying a frame across which a blanket may be draped and form a comfortable back rest for a person using the seat.

Another object of the invention is to provide a back so formed that it may be easily and quickly applied to a seat for use and also easily removed when no longer needed and reduced to a compact mass so that it may be conveniently carried from one place to another.

Another object of the invention is to provide a back consisting of a few number of parts which are of simple construction and may be very easily assembled and removably mounted in position for use upon a seat.

The invention is illustrated in the accompanying drawings wherein:

Fig. 1 is a perspective view showing the back rest applied to a seat.

Fig. 2 is a view showing a side bracket and a portion of the yoke or frame partially in section and partially in elevation.

This improved back rest consists of brackets 1 adapted to be applied to a seat 2 of a boat or grandstand and a yoke or frame 3 carried by the brackets 1. The brackets are of duplicate construction and each has a base portion 4 and an upright arm 5 extending vertically from the rear end of the base 4. A triangular web 6 serves as a reinforcement for the bracket and along its diagonal margin the web is formed with a socket 7 which extends diagonally and is open at its upper end. The forward portion of the base 4 is extended downwardly and then rearwardly to form a clamp 8 having its lower arm formed at its rear end with an enlargement 9 bored and threaded to receive the threaded shank of a thumb screw 10. When the thumb screw is grasped by its winged head 11 and turned in a tightening direction its upper end will abut the under surface of the seat and the bracket will be firmly held to the seat. By loosening the thumb screw the bracket may be shifted forwardly off of the seat or shifted longitudinally of the seat to an adjusted position and again secured by tightening the screw. It will thus be seen that the brackets may be easily applied to the seat and shifted longitudinally thereof until they are so spaced from each other that the arms 12 of the frame or yoke 3 may be slid downwardly into the sockets 7 and the thumb screws then tightened to firmly hold the brackets to the seat. Of course the yoke may have its arms applied to the brackets and the brackets then slid into engagement with the seat if so desired. It will also be understood that by forming the yoke of companion sections having their bridge-forming portions in telescoping engagement with each other the back rest may be adjusted transversely to provide a back rest of desired width. A rib 13 which extends along the forward portion of the base and downwardly along the clamp 8 serves to reinforce the clamp and prevent it from being broken by strain applied when the thumb screw is tightened.

When this back rest is in use the brackets are applied to the seat and the arms of the yoke or frame fitted into the sockets of the brackets. The thumb screws are then tightened and the brackets will be firmly held to the seat. A blanket is then draped over the bridge of the frame 3 with a portion of the blanket extending forwardly across the seat and downwardly in front of the seat. A person may then sit upon the blanket with his back resting against the portion of the blanket extending between the bridge of the frame and the seat. This will provide a very comfortable seat and back support. When the seat is no longer to be occupied the blanket is removed, the frame drawn upwardly out of engagement with the brackets, and the thumb screws loosened so that the brackets may be shifted forwardly out of engagement with the seat. The back rest and the frame will thus be taken apart and may be packed in a small package for transportation and storage in a small compartment until again to be used.

Having thus described the invention, what is claimed is:

A portable back rest for a seat comprising triangular brackets each of unitary formation and having a base bar formed at its front end with a depending portion terminating in a rearwardly extending portion and forming a clamp for engaging under the front edge portion of a seat upon which the base bar rests, the rearwardly extending portion of the clamp being formed with a vertically extending threaded opening, a thumb screw threaded upwardly through said opening for gripping the under face of the forward portion of a seat between the screw and the base bar and firmly holding the bracket in place upon the seat, an arm extending vertically from the rear end of the base bar, a bracing bar for said bracket extending upwardly at a rearward incline from the forward end portion of the base bar to the upper end of said arm and formed with a longitudinally extending socket open at its upper end, and a frame having a horizontal bridge extending between said brackets above the upper ends thereof and arms at ends of the bridge extending downwardly therefrom and fitting into said sockets to removably support the frame at a rearward incline between the brackets whereby a blanket may be draped across the bridge of the frame with the blanket extending downwardly from the bridge between the brackets to the seat and a portion of the blanket extending forwardly across and resting upon the portion of the seat between the brackets.

ORRIN O. TORREY.

REFERENCES CITED

The following references are of record in the file of this patent:

UNITED STATES PATENTS

| Number | Name | Date |
| --- | --- | --- |
| 815,190 | Marchessault | Mar. 13, 1906 |
| 823,199 | Amann | June 12, 1906 |
| 1,312,774 | Barrett | Aug. 12, 1919 |

FOREIGN PATENTS

| Number | Country | Date |
| --- | --- | --- |
| 182,675 | Great Britain | July 13, 1922 |